United States Patent [19]
Shinohara et al.

[11] Patent Number: 5,340,170
[45] Date of Patent: Aug. 23, 1994

[54] PIPE JOINT AND GASKET RETAINER FOR USE IN PIPE JOINT

[75] Inventors: Tsutomu Shinohara; Michio Yamaji; Kazuhiro Yoshikawa; Kenji Yamamoto, all of Osaka, Japan

[73] Assignee: Fujikin Incorporated, Osaka, Japan

[21] Appl. No.: 46,885

[22] Filed: Apr. 14, 1993

[30] Foreign Application Priority Data

Apr. 20, 1992 [JP] Japan .................. 4-099309

[51] Int. Cl.⁵ ............................... F16L 19/00
[52] U.S. Cl. .................. 285/379; 285/328; 277/189
[58] Field of Search ............ 285/379, 328; 277/189

[56] References Cited

U.S. PATENT DOCUMENTS

| 503,344 | 8/1893 | Flectcher | 285/379 |
|---|---|---|---|
| 917,388 | 4/1909 | Welch, Jr. | 285/379 |
| 1,163,726 | 12/1915 | Weston | 285/379 |
| 2,462,762 | 2/1949 | Nardin | 285/379 |
| 2,822,201 | 2/1958 | Wood | 285/379 |
| 4,394,024 | 7/1983 | Delhaes | 285/379 |
| 4,838,583 | 6/1989 | Babuder et al. | 285/379 |
| 5,044,641 | 9/1991 | Belter | 277/189 |
| 5,078,533 | 1/1992 | Madonio et al. | 277/189 |
| 5,145,219 | 9/1992 | Babuder | 285/379 |
| 5,163,721 | 11/1992 | Babuder | 285/379 |

FOREIGN PATENT DOCUMENTS

| 0482865 | 4/1992 | European Pat. Off. | |
|---|---|---|---|
| 514793 | 11/1992 | European Pat. Off. | 285/379 |
| 2532036 | 2/1984 | France | |
| 581289 | 10/1976 | Switzerland | 277/189 |
| 565387 | 11/1944 | United Kingdom | 277/189 |
| 2184174 | 6/1987 | United Kingdom | 277/189 |

*Primary Examiner*—Eric K. Nicholson
*Attorney, Agent, or Firm*—Armstrong, Westerman, Hattori, McLeland & Naughton

[57] ABSTRACT

A pipe joint comprises a pair of tubular joint members having a gasket holding annular projection on each of butting end faces thereof, an annular gasket interposed between the butting end faces of the joint members, a retainer for causing one of the joint members to hold the gasket thereto, and a nut for connecting the joint members together. The retainer comprises an annular portion, a gasket holding portion having a plurality of claws inwardly projecting from the annular portion for holding the outer periphery of the gasket, and a joint member holding portion formed in the annular portion and engageable with the end face of one of the joint members. The gasket is provided on its outer periphery with a slipping-off preventing portion engageable with the claws of the gasket holding portion of the retainer.

8 Claims, 3 Drawing Sheets 3, and a joint member holding portion 29 engageable with the right end of the first joint member 1.

The three claws 28 are slightly elastic. The free end of each claw 28 has a curvature equal to the curvature of the outer periphery of the gasket 3. The gasket 3 is fitted in the retainer 5 inside the claws 28 and prevented from moving radially and axially relative to the retainer 5 by the elastic force of the claws 28.

A pair of axial cutouts is formed in the annular portion 25 of the retainer 5 at the position of each of the three claws 28 to provide a holding claw 30. The joint member holding portion 29 comprises these three claws 30. The three holding claws 30 elastically grip the right end of the first joint member 1, whereby the retainer 5 is held to the first joint member 1.

The gasket 3, which is made of nickel alloy, is plated with silver when so required. Austenitic stainless steel, copper, aluminum alloy or like suitable material is usable for making the gasket 3. The gasket 3 has on the outer periphery of its left end a slipping-off preventing portion 15 in the form of an outer flange and engageable with the gasket holding portion 26 of the retainer 5. Accordingly, the gasket 3, even if forced against the retainer 5, will not slip off the retainer 5 from the right side thereof. This makes it easy to cause the retainer 5 to hold the gasket 3 thereon and to cause the joint member 1, 2 to hold the retainer 5 therebetween.

The joint members 1, 2 are formed on their butting end faces with gasket holding annular projections 7, 8, respectively, along the inner peripheries thereof and with overtightening preventing annular projections 9, 10, respectively, along the outer peripheries thereof. The height of the gasket holding annular projections 7, 8 is slightly smaller than the amount by which each of the joint members 1, 2 is moved axially thereof (in the right-left direction) relative to the gasket 3 when the joint is properly tightened up. Each of the projections 7, 8 is adapted to come into contact with the inner edge portion of the gasket 3 over the entire circumference thereof. The overtightening preventing annular projections 9, 10 project outward beyond the respective projections 7, 8 and are adapted to press the retainer 5 on its respective surfaces when the nut 4 is tightened up properly.

The nut 4 is formed at its right end with an inner flange 11, which is fitted around the second joint member 2. The nut 4 has an internally threaded left end portion 12, which is screwed on an externally threaded portion 14 at the right end of the first joint member 1. An outer flange 13 is formed around the left end of the second joint member 2. A thrust ball bearing 6 for preventing conjoint rotation is interposed between the flange 13 and the inner flange 11 of the nut 4.

FIG. 4 shows a second embodiment, which differs from the first embodiment only in the retainer. Throughout FIGS. 1 to 4, like parts are designated by like reference numerals.

The retainer 31 of the second embodiment is made integrally of a stainless steel plate and comprises an annular portion 32, a gasket holding portion 33 comprising three claws 34 inwardly projecting from the right end of the annular portion 32 for holding the outer periphery of a gasket 3, and a joint member holding portion 36 engageable with the right end of a first tubular joint member 1.

The three claws 34 have slight elasticity.

The radially free end of each claw 34 provides a lug 35 bent rightward and having slight elasticity. Before the gasket 3 is fitted into the retainer 31, the lug 35 is bent at an angle larger than a right angle as indicated in a broken line in FIG. 4. When the gasket 3 is fitted to the inside of the claws 34 with the bent lugs 35 in intimate contact with the gasket 3, the gasket 3 is held in the retainer 31 and prevented from moving radially and axially thereof.

A pair of axial cutouts is formed in the annular portion 32 at the position of each of the three claws 34 to provide a holding claw 37. The joint member holding portion 36 comprises these three claws 37. The three holding claws 37 grip the right end of the first joint member 1 elastically, whereby the retainer 31 is held to the first joint member 1.

FIG. 5 shows a third embodiment, which differs from the first embodiment only in the gasket. Throughout FIGS. 1 to 5, like parts are designated by like reference numerals.

The gasket of the third embodiment, indicated at 16, is formed in the center of its outer periphery with a slipping-off preventing portion 17 in the form of an annular groove for claws 28 of gasket holding portion 26 of the retainer 5 to fit in. Accordingly, the gasket 16, even if forced against the retainer 5, will not slip off the retainer 5 from the right side thereof. This makes it easy to cause the retainer 5 to hold the gasket 16 thereto and to cause joint members 1, 2 to hold the retainer 5 therebetween.

FIG. 6 shows a fourth embodiment, which differs from the first embodiment only in the gasket. Throughout FIGS. 1 to 6, like parts are designated by like reference numerals.

The gasket of the fourth embodiment, indicated at 18, is formed at the center of its outer periphery with a slipping-off preventing portion 19 comprising a pair of opposite annular ridges engageable with claws 28 of gasket holding portion 26 of the retainer 5. Accordingly, the gasket 18, even if forced against the retainer 5, will not slip off the retainer 5 from the right side thereof. This makes it easy to cause the retainer 5 to hold the gasket 18 thereto and to cause joint members 1, 2 to hold the retainer 5 therebetween.

The gasket holding portion 26 or 33 comprises three claws 28 or 34 according to the foregoing embodiments, whereas the number of claws is variable suitably. Although the joint member holding portion 29 or 36 comprises three holding claws 30 or 37, this portion can be modified suitably. Furthermore, the overtightening preventing annular projections 9, 10 can be dispensed with.

What is claimed is:

1. A retainer for use in pipe joints for causing one of a pair of tubular joint members to hold an annular gasket thereto as interposed between butting end faces of the joint members, the retainer comprising an annular portion having a radially rigid end, a gasket holding portion having a plurality of claws radially inwardly projecting from the end of the annular portion for holding the outer periphery of the gasket, and a joint member holding portion axially extending from the end of the annular portion and engageable with the end face of one of the joint members.

2. A retainer as defined in claim 1 wherein each of the claws has a free end having the same curvature as the outer periphery of the gasket.

3. A retainer as defined in claim 1 wherein each of the claws has a free end provided with a bent lug engageable with the gasket in intimate contact therewith.

PIPE JOINT AND GASKET RETAINER FOR USE IN PIPE JOINT

BACKGROUND OF THE INVENTION

The present invention relates to pipe joints and retainers for use in pipe joints.

Pipe joints are already known which comprise a pair of tubular joint members having a gasket holding annular projection on each of butting end faces thereof, an annular gasket interposed between the butting end faces of the joint members, a retainer for causing one of the joint members to hold the gasket thereto, and threaded means for connecting the joint members together. The conventional retainer comprises an annular end wall, a cylindrical side wall extending from the outer peripheral edge of the end wall approximately perpendicular thereto, and a joint member holding portion extending from the side wall in the same direction for holding the end face of the joint member. A recess for holding the gasket therein is defined by the end wall and the side wall (see Examined Japanese Patent Publication No. 62756/1990).

The retainer incorporated in the conventional pipe joint permits slight radial play of the gasket relative thereto, so that the joint has problems. The gasket is likely to slip off the retainer while being held to the retainer before assembling. When the joint is re-assembled, the gasket holding annular projection will be out of register with an indentation formed in each surface of the gasket by the projection pressed thereagainst to adversely influence the sealing effect.

SUMMARY OF THE INVENTION

The main object of the present invention is to provide a retainer for use in pipe joints which does not permit the movement of the gasket within the retainer and a pipe joint which is excellent in sealing effect.

The present invention provides a retainer for use in pipe joints for causing one of a pair of tubular joint members to hold an annular gasket thereto as interposed between butting end faces of the joint members, the retainer comprising an annular portion, a gasket holding portion having a plurality of claws inwardly projecting from the annular portion for holding the outer periphery of the gasket, and a joint member holding portion formed in the annular portion and engageable with the end face of one of the joint members.

With the retainer of the invention for use in pipe joints, the gasket holding portion has a plurality of claws inwardly projecting from the annular portion and holds the outer periphery of the gasket, which is therefore prevented from moving radially and axially relative to the retainer. This obviates the likelihood that the gasket will slip off the retainer after the gasket and the retainer have been assembled, further eliminating an adverse influence that would be exerted on the sealing effect if the gasket holding projection is out of register with the gasket indentation when the joint is reassembled. Although the gasket slightly increases in outside diameter when the pipe joint is tightened up, this deformation is absorbed by the deformation of the claws constituting the gasket holding portion, whereby the joint member holding portion is made free of the influence of the deformation of the gasket for the retainer to hold the joint member as desired.

According to an aspect of the invention, the radially inner surface end of each of the claws has a curvature equal to the curvature of the outer periphery of the gasket. This enables the retainer to retain the gasket over an increased area and therefore more effectively. According to another aspect of the invention, the free end of each claw has a bent lug to be brought into intimate contact with the gasket. The bent lug also holds the gasket, consequently enabling the retainer to retain the gasket more reliably.

The present invention also provides a pipe joint which comprises a pair of tubular joint members having a gasket holding annular projection on each of butting end faces thereof, an annular gasket interposed between the butting end faces of the joint members, a retainer for causing one of the joint members to hold the gasket thereto, and threaded means for connecting the joint members together, the retainer comprising an annular portion, a gasket holding portion having a plurality of claws inwardly projecting from the annular portion for holding the outer periphery of the gasket, and a joint member holding portion formed in the annular portion and engageable with the end face of one of the joint members.

The retainer holds the gasket therein immovably to assure the present pipe joint of an outstanding sealing effect.

The gasket may be provided on its outer periphery with a slipping-off preventing portion engageable with the claws of the gasket holding portion of the retainer. The gasket is then prevented from slipping off the retainer even when forcibly pressed against the retainer.

DESCRIPTION OF THE PREFERRED EMBODIMENTS

Several embodiments of the present invention will be described below with reference to the accompanying drawings. In the following description, the terms "right" and "left" refer to the right-hand side and left-hand side of the drawings, respectively.

Figure 1:
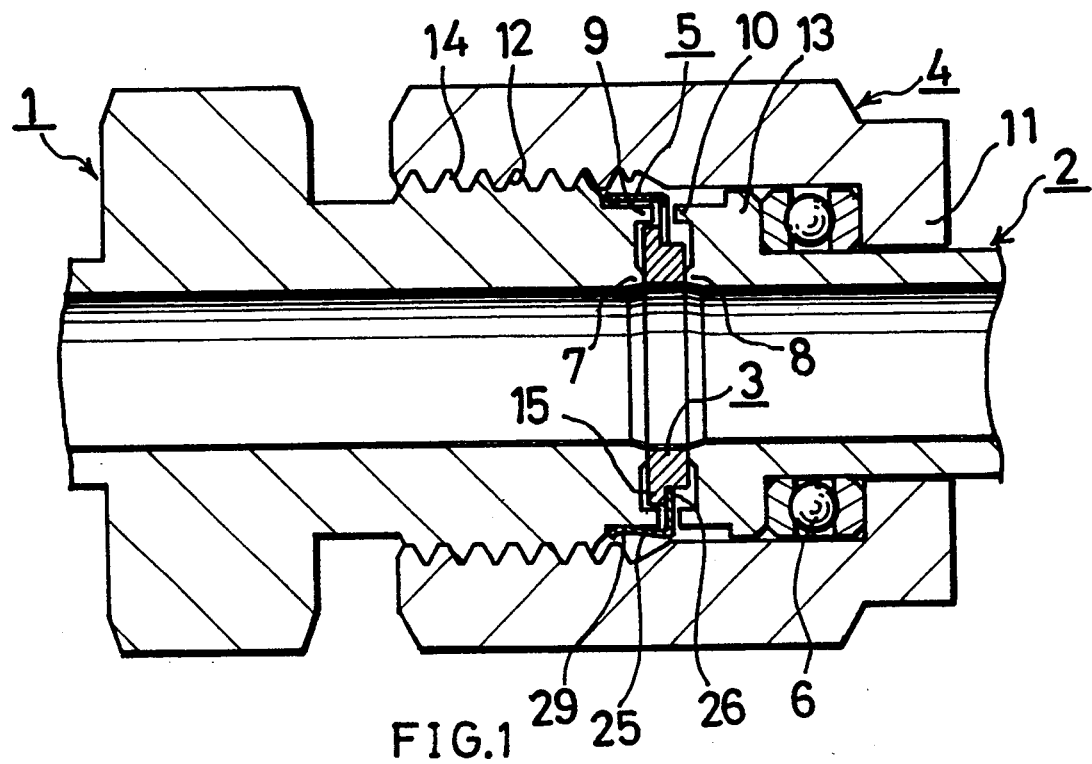
FIG. 1 is a view in longitudinal section showing a first embodiment of the invention, i.e., a pipe joint and a retainer included therein.
Figure 2:
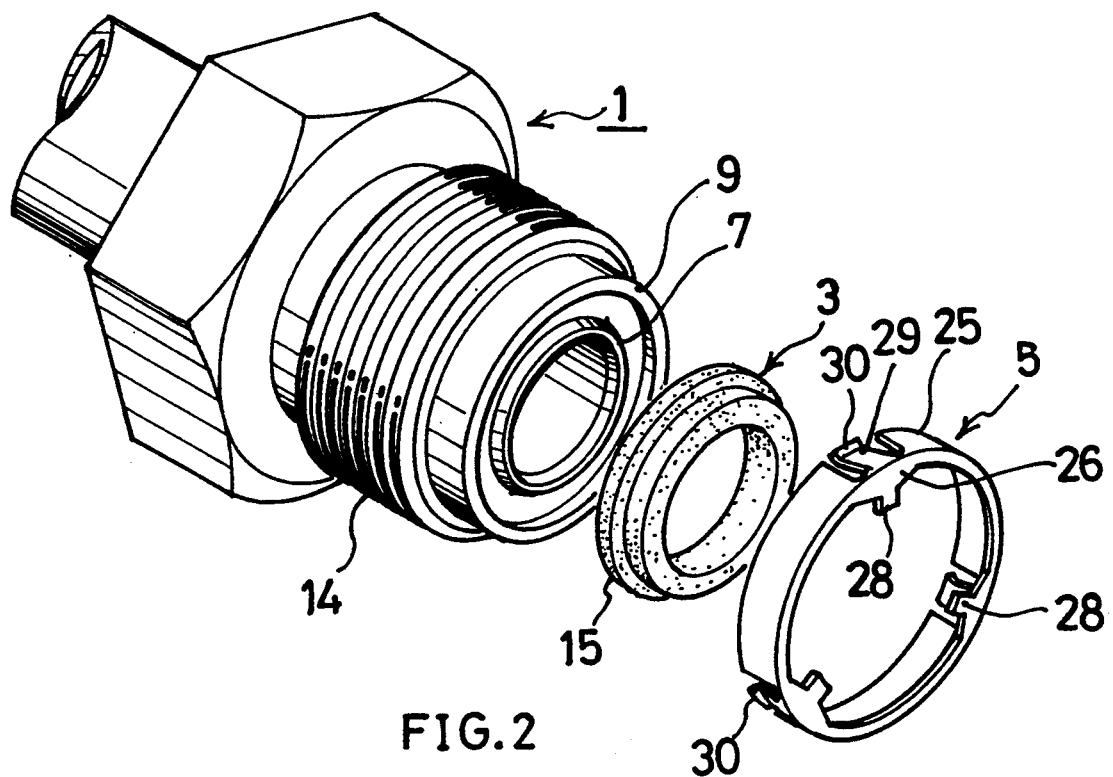
FIG. 2 is an exploded fragmentary perspective view of FIG. 1.
Figure 3:
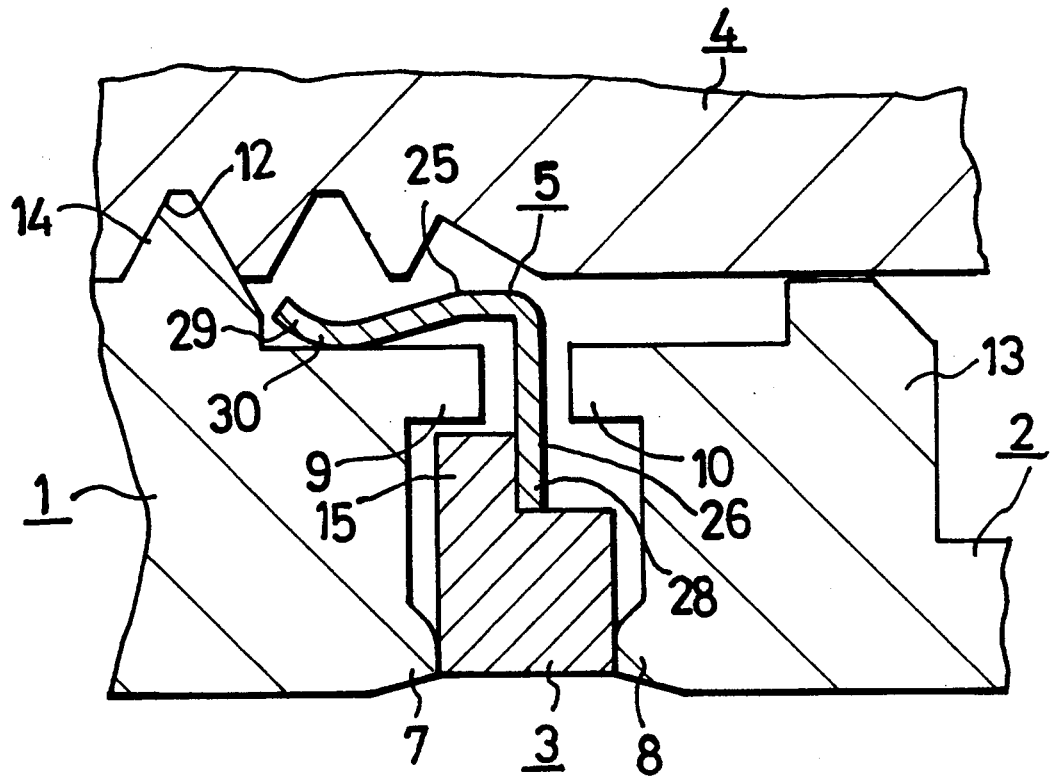
FIG. 3 is an enlarged fragmentary view of FIG. 1.
Figure 4:
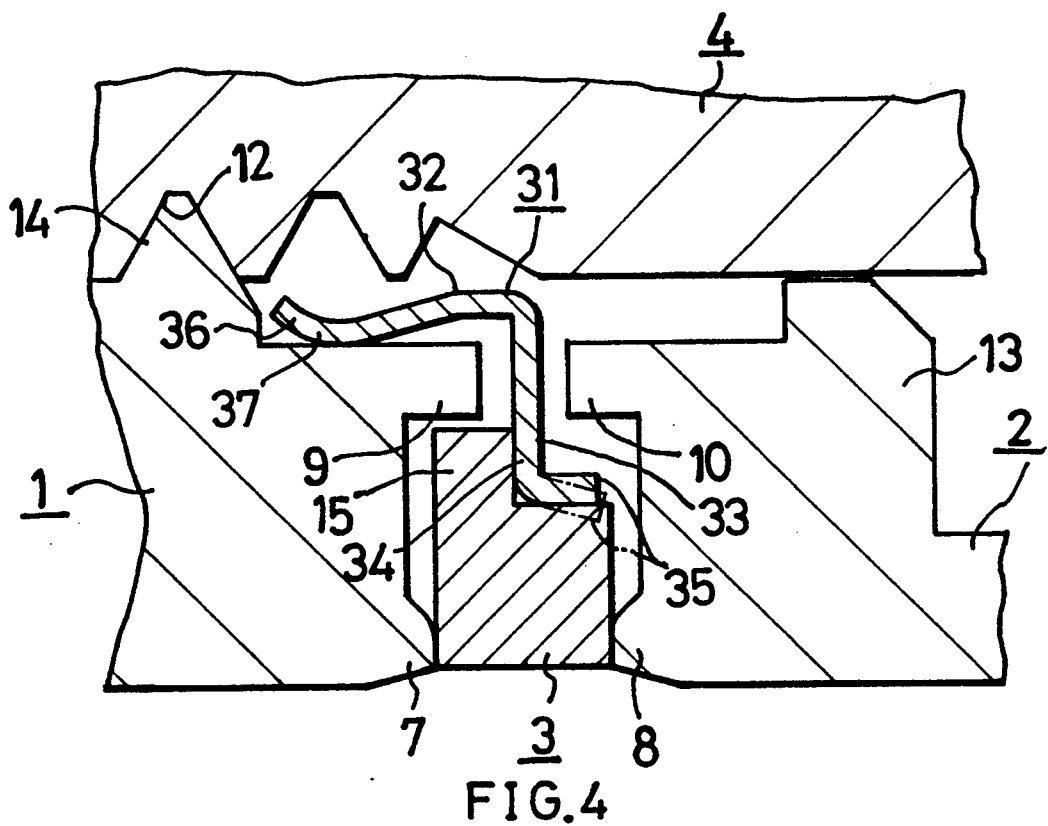
FIG. 4 is an enlarged fragmentary view in section of a second embodiment.
Figure 5:
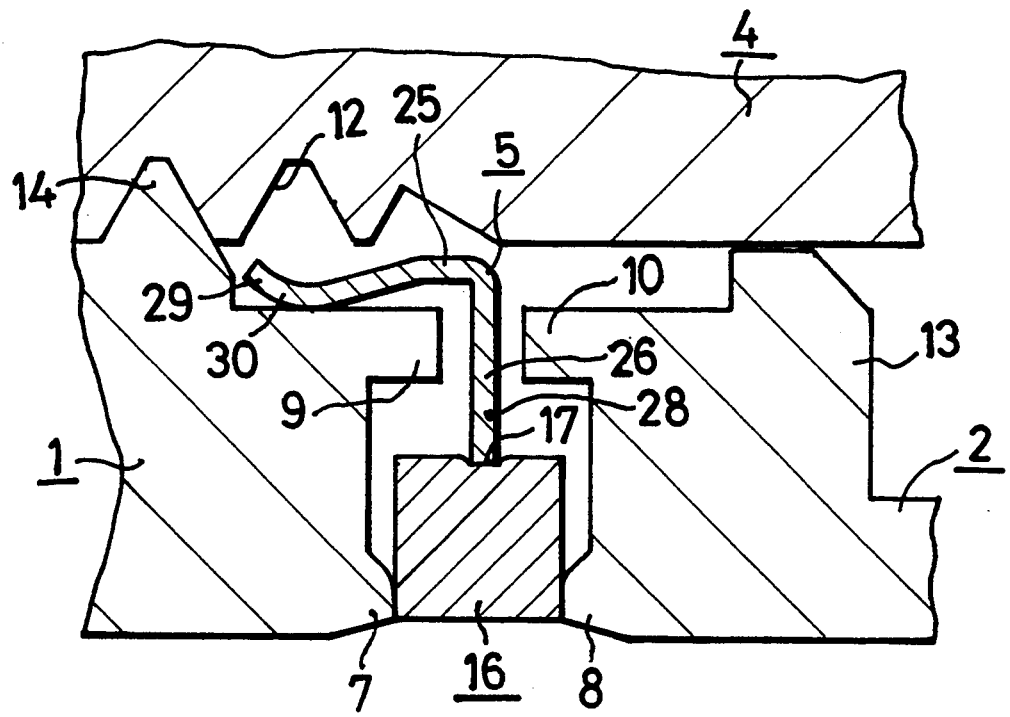
FIG. 5 is an enlarged fragmentary view in section of a third embodiment.
Figure 6:
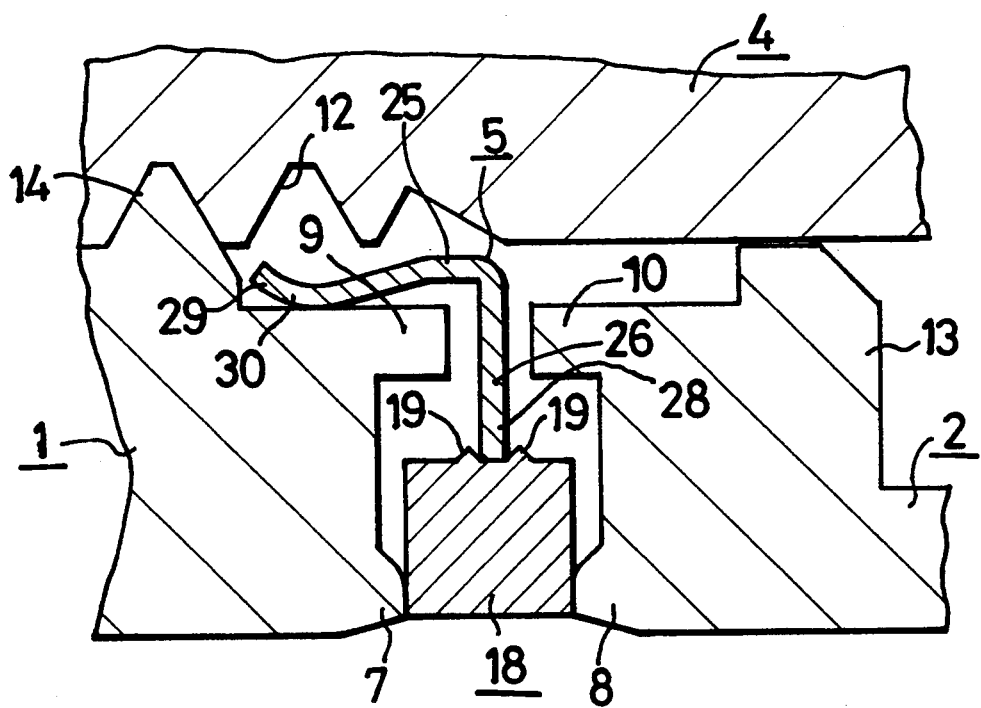
FIG. 6 is an enlarged fragmentary view in section of a fourth embodiment.

FIGS. 1 to 3 show a pipe joint which comprises a first tubular joint member 1, a second tubular joint member 2, an annular gasket 3 interposed between the right end face of the first joint member 1 and the left end face of the second joint member 2, and a retainer 5 holding the gasket 3 thereon and held to the first joint member 1. The second joint member 2 is fastened to the first joint member 1 by a nut 4 provided on the second joint member 2 and screwed on the first joint member 1.

The retainer 5, which is in the form of an integral plate of stainless steel, comprises an annular portion 25, a gasket holding portion 26 including three claws 28 inwardly projecting from the right end of the annular portion 25 for holding the outer periphery of the gasket 4. A pipe joint comprising a pair of tubular joint members having a gasket holding annular projection on each of butting end faces thereof, an annular gasket interposed between the butting end faces of the joint members, a retainer for causing one of the joint members to hold the gasket thereto, and threaded means for connecting the joint members together, the retainer comprising an annular portion having a radially rigid end, a gasket holding portion having a plurality of claws radially inwardly projecting from the end of the annular portion for holding the outer periphery of the gasket, and a joint member holding portion axially extending from the end of the annular portion and engageable with the end face of one of the joint members.

5. A pipe joint as defined in claim 4 wherein the gasket is provided on its outer periphery with a slipping-off preventing portion engageable with the claws of the gasket holding portion of the retainer.

6. A pipe joint as defined in claim 5 wherein the slipping-off preventing portion comprises an outer flange formed on the outer periphery of the gasket.

7. A pipe joint comprising a pair of tubular joint members having a gasket holding annular projection on each of butting end faces thereof, an annular gasket interposed between the butting end faces of the joint members, a retainer for causing one of the joint members to hold the gasket thereto, and threaded means for connecting the joint members together, the retainer comprising an annular portion, a gasket holding portion having a plurality of claws inwardly projecting from the annular portion for holding the outer periphery of the gasket, and a joint member holding portion formed in the annular portion and engageable with the end face of one of the joint members, said slipping-off preventing portion of said gasket comprising an annular groove formed on the outer periphery of said gasket in the center thereof.

8. A pipe joint comprising a pair of tubular joint members having a gasket holding annular projection on each of butting end faces thereof, an annular gasket interposed between the butting end faces of the joint members, a retainer for causing one of the joint members to hold the gasket thereto, and threaded means for connecting the joint members together, the retainer comprising an annular portion, a gasket holding portion having a plurality of claws inwardly projecting from the annular portion for holding the outer periphery of the gasket, and a joint member holding portion formed in the annular portion and engageable with the end face of one of the joint members, slipping-off prevention portion of said gasket comprising a pair of oppositely spaced annular ridges formed on the outer periphery of said gasket in the center thereof.

* * * * *